(12) United States Patent
Moore et al.

(10) Patent No.: US 6,915,454 B1
(45) Date of Patent: Jul. 5, 2005

(54) WEB CONTROLS VALIDATION

(75) Inventors: Anthony J. Moore, Seattle, WA (US); Susan M. Warren, Carnation, WA (US); Scott D. Guthrie, Bellevue, WA (US); Steven A. Isaac, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 09/879,790

(22) Filed: Jun. 12, 2001

(51) Int. Cl.[7] .............................................. G06F 11/00
(52) U.S. Cl. ........................................ 714/38; 717/124
(58) Field of Search ............................... 714/38, 37, 47; 717/124, 116, 127, 141

(56) References Cited

U.S. PATENT DOCUMENTS

| | | |
|---|---|---|
| 3,937,925 A | 2/1976 | Boothroyd |
| 3,956,615 A | 5/1976 | Anderson et al. |
| 4,186,871 A | 2/1980 | Anderson et al. |
| 4,807,154 A | 2/1989 | Scully et al. |
| 4,847,785 A | 7/1989 | Stephens |
| 4,949,300 A | 8/1990 | Christenson et al. |
| 4,979,148 A | 12/1990 | Bush et al. |
| 5,299,315 A | 3/1994 | Chin et al. |
| 5,349,657 A | 9/1994 | Lee |
| 5,388,156 A | 2/1995 | Blackledge, Jr. et al. |
| 5,465,332 A | 11/1995 | Deloye et al. |
| 5,517,655 A | 5/1996 | Collins et al. |
| 5,548,340 A | 8/1996 | Bertram |
| 5,550,560 A | 8/1996 | Kanada et al. |
| 5,604,908 A | 2/1997 | Mortson |
| 5,638,176 A | 6/1997 | Hobbs et al. |
| 5,640,449 A | 6/1997 | Worley et al. |
| 5,664,228 A | 9/1997 | Mital |
| 5,675,520 A | 10/1997 | Pitt, III et al. |
| 5,706,505 A | 1/1998 | Fraley et al. |

(Continued)

FOREIGN PATENT DOCUMENTS

| | | | |
|---|---|---|---|
| EP | 01111679 A2 | 12/2000 | |
| EP | 1156415 | 11/2001 | |
| EP | 001156415 A2 * | 11/2001 | ............. G06F/9/44 |
| EP | 1164473 | 12/2001 | |
| EP | 001164473 A2 * | 12/2001 | ............. G06F/9/44 |
| EP | 01111678.7-2201 | 4/2002 | |
| EP | 01111680.3-2201 | 4/2002 | |
| EP | 01111681.1-2201 | 4/2002 | |
| EP | 01111682.9-2201 | 4/2002 | |
| WO | WO 98/21651 | 5/1998 | |
| WO | WO 98/44695 | 10/1998 | |
| WO | WO 99/34288 | 7/1999 | |

OTHER PUBLICATIONS

Hammock™, Thinking of its as Swing™ for the Web (10 pages).
OOP Launches Hammock at JavaOne (1 page).
Hammock swings through Web interfaces (3 pages) by Eric Hammond.

(Continued)

*Primary Examiner*—Nadeem Iqbal
(74) *Attorney, Agent, or Firm*—Merchant & Gould P.C.

(57) ABSTRACT

Web control validation may be defined using one or more declarations that are included in an ASP+ file by the web page author. The declarations specify server-side objects that validate the input data received in the web page and provide error handling in the event of a validation failure error. Validation declaration parameters specify the validation criteria against which the input data is validated. Example validation operations involve regular expressions, required fields, data comparison, range comparison and custom validation. Validation parameters can also specify- either server-side validation or client-side validation, depending on the client browser's capabilities. In a server-side scenario, a server-side validation object processes the input data received in an HTTP request from the client. In a client-side scenario, a server-side validation object renders the appropriate client-side code to validate the input data without a round trip between the client and the server.

21 Claims, 17 Drawing Sheets

U.S. PATENT DOCUMENTS

| | | | |
|---|---|---|---|
| 5,732,256 A | | 3/1998 | Smith |
| 5,732,267 A | | 3/1998 | Smith |
| 5,745,103 A | | 4/1998 | Smith |
| 5,748,890 A | | 5/1998 | Goldberg et al. |
| 5,774,670 A | | 6/1998 | Montulli |
| 5,793,982 A | * | 8/1998 | Shrader et al. ............. 709/232 |
| 5,812,996 A | | 9/1998 | Rubin et al. |
| 5,835,724 A | | 11/1998 | Smith |
| 5,855,020 A | * | 12/1998 | Kirsch ......................... 707/10 |
| 5,878,141 A | | 3/1999 | Daly et al. |
| 5,878,282 A | | 3/1999 | Mital |
| 5,897,622 A | | 4/1999 | Blinn et al. |
| 5,911,068 A | | 6/1999 | Zimmerman et al. |
| 5,918,007 A | | 6/1999 | Blackledge, Jr. et al. |
| 5,940,075 A | | 8/1999 | Mutschler, III et al. |
| 5,940,847 A | | 8/1999 | Fein et al. |
| 5,949,300 A | | 9/1999 | Christenson et al. |
| 5,953,524 A | | 9/1999 | Meng et al. |
| 5,956,489 A | | 9/1999 | San Andres et al. |
| 5,961,601 A | | 10/1999 | Iyengar |
| 5,963,952 A | | 10/1999 | Smith |
| 5,983,227 A | | 11/1999 | Nazem et al. |
| 5,991,802 A | | 11/1999 | Allard et al. |
| 6,006,230 A | | 12/1999 | Ludwug et al. |
| 6,014,637 A | * | 1/2000 | Fell et al. ..................... 705/26 |
| 6,014,666 A | | 1/2000 | Helland et al. |
| 6,032,207 A | | 2/2000 | Wilson |
| 6,038,551 A | | 3/2000 | Barlow et al. |
| 6,067,578 A | | 5/2000 | Zimmerman et al. |
| 6,072,664 A | | 6/2000 | Aoyagi et al. |
| 6,076,108 A | | 6/2000 | Courts et al. |
| 6,101,607 A | | 8/2000 | Bachand et al. |
| 6,108,717 A | | 8/2000 | Kimura et al. |
| 6,115,744 A | | 9/2000 | Robins |
| 6,121,968 A | | 9/2000 | Arcuri et al. |
| 6,138,150 A | | 10/2000 | Nichols et al. |
| 6,167,524 A | | 12/2000 | Goodnow et al. |
| 6,178,461 B1 | | 1/2001 | Chan et al. |
| 6,185,608 B1 | | 2/2001 | Hon et al. |
| 6,203,220 B1 | | 3/2001 | Takenoshita et al. |
| 6,205,480 B1 | | 3/2001 | Broadhurst et al. |
| 6,212,192 B1 | | 4/2001 | Mirashrafi et al. |
| 6,218,958 B1 | | 4/2001 | Eichstaedt et al. |
| 6,230,160 B1 | | 5/2001 | Chan et al. |
| 6,246,422 B1 | | 6/2001 | Emberling et al. |
| 6,247,044 B1 | | 6/2001 | Gosling et al. |
| 6,253,228 B1 | | 6/2001 | Ferris et al. |
| 6,253,234 B1 | | 6/2001 | Hunt et al. |
| 6,279,151 B1 | | 8/2001 | Breslau et al. |
| 6,286,133 B1 | | 9/2001 | Hopkins |
| 6,326,957 B1 | | 12/2001 | Nathan et al. |
| 6,334,157 B1 | | 12/2001 | Oppermann et al. |
| 6,343,148 B2 | | 1/2002 | Nagy |
| 6,351,767 B1 | | 2/2002 | Batchelder et al. |
| 6,353,447 B1 | | 3/2002 | Truluck et al. |
| 6,354,477 B1 | | 3/2002 | Trummer |
| 6,363,352 B1 | | 3/2002 | Dailey et al. |
| 6,370,561 B1 | | 4/2002 | Allard et al. |
| 6,373,841 B1 | | 4/2002 | Goh et al. |
| 6,397,253 B1 | | 5/2002 | Quinlan et al. |
| 6,401,099 B1 | | 6/2002 | Koppolu et al. |
| 6,405,241 B2 | | 6/2002 | Gosling et al. |
| 6,412,008 B1 | | 6/2002 | Fields et al. |
| 6,430,575 B1 | | 8/2002 | Dourish et al. |
| 6,460,071 B1 | | 10/2002 | Hoffman |
| 6,460,141 B1 | | 10/2002 | Olden |
| 6,463,442 B1 | | 10/2002 | Bent et al. |
| 6,480,894 B1 | | 11/2002 | Courts et al. |
| 6,487,665 B1 | | 11/2002 | Andrews et al. |
| 6,505,238 B1 | | 1/2003 | Tran |
| 6,546,516 B1 | | 4/2003 | Wright et al. |
| 6,557,038 B1 | | 4/2003 | Becker et al. |
| 6,560,598 B2 | * | 5/2003 | Delo et al. ..................... 707/4 |
| 6,560,618 B1 | | 5/2003 | Ims |
| 6,564,251 B2 | | 5/2003 | Katariya et al. |
| 6,591,272 B1 | | 7/2003 | Williams |
| 6,606,418 B2 | | 8/2003 | Mitchell et al. |
| 6,622,168 B1 | | 9/2003 | Datta |
| 6,633,416 B1 | | 10/2003 | Benson |
| 6,725,219 B2 | | 4/2004 | Nelson et al. |
| 6,728,421 B2 | | 4/2004 | Kokemohr |
| 2001/0054020 A1 | | 12/2001 | Barth et al. |
| 2002/0004815 A1 | | 1/2002 | Muhlestein et al. |
| 2002/0008703 A1 | | 1/2002 | Merrill et al. |
| 2002/0083171 A1 | * | 6/2002 | Hoogenboom et al. ..... 709/225 |
| 2002/0108102 A1 | | 8/2002 | Muhlestein et al. |
| 2002/0188890 A1 | * | 12/2002 | Shupps et al. ................ 714/38 |
| 2003/0009476 A1 | | 1/2003 | Fomenko et al. |
| 2003/0009567 A1 | | 1/2003 | Farouk |
| 2003/0018827 A1 | | 1/2003 | Gutherie et al. |
| 2003/0025728 A1 | | 2/2003 | Ebbo et al. |
| 2003/0028565 A1 | | 2/2003 | Landsman et al. |
| 2003/0074634 A1 | | 4/2003 | Emmelmann |
| 2003/0097639 A1 | | 5/2003 | Niyogi et al. |
| 2004/0003112 A1 | | 1/2004 | Alles et al. |
| 2004/0003139 A1 | | 1/2004 | Cottrille et al. |
| 2004/0003248 A1 | | 1/2004 | Arkhipov |
| 2004/0073873 A1 | | 4/2004 | Croney et al. |

OTHER PUBLICATIONS

Wu, Dapeng; Hou, Yiwci Thomas; Zhang, Ya–Qin; "Scalable Video Transport over Wireless IP Networks"; IEEE 2000; pp. 1185–1191.

Dobson, Rick; "Data Binding in Dynamic HTML"; DBMS Mar. 1998 pp. 47–52.

Penn, Gerald; Hu, Jianying; Luo, Hengbin; McDonald, Ryan; "Flexible Web Document Analysis for Delivery to Narrow–Bandwidth Devices"; IEEE 2001; pp. 1074–1078.

Esposito, Dino; "Heaven Sent"; Developer Network Journal issue 23 Mar./Apr. 2001 pp. 18–24.

Hovanes, Michael E.; Deal, John R. Grizz; Rowberg, Alan H.; "Seamless Multiresolution Display of Portable Wavelet–Compressed Images" Journal of Digital Imaging, vol. 12, No. 2, suppl 1 (May), 1999, pp 109–111.

Ingham; David B; "W3Objects: A Distributed Object–Oriented Web Server" Object–Oriented Web Servers and data Modeling Workshop, Sixth International World Wide Web Conference, Apr. 7, 1997, Santa Clara, CA 4 pages.

Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol 467 (2002) pp. 28–33.

Anderson, Richard; Homer, Alex; Howard, Rob; Sussman, Dave; "A Preview of Active Server Pages+"; Copyright 2000, Wrox Press, pp. 1–73.

"HTML Encyclopaedia"; http://www.scit.wlv.ac.uk/encyc/form.html; 2 pages.

"A Brief History of Hypertext" Microsoft Corporation, 1996, 1 page.

Duan, Nick N.; "Distributed Database Access in a Corporate Environment Using Java" Bell Atlantic Corporation; 1996; 8 pages.

Nadamoto, Akiyo; Kondo, Hiroyuki; Tanaka, Katsumi; "WebCarousel: Restructuring Web Search Results for Passive Viewing in Mobile Environments" IEEE 2001 p. 164–165.

Developing ASP–Based Applications: Microsoft 1996, 5 pages.

"ColdFusion: Web Application Server"; Allair Corp; www.allair.com; 1995–1999.

"Alterego Networks Introduces First Mobile Web Server for Enterprises, Telcos and Providers"; Redwood City, CA; Nov. 14, 2000; 3 pages.

"Bluestone Software Layes Foundation for Internet Operating Environment with Total–E–Server . . . " Screaming Media, Business Wire; Jun. 5, 2000; 3 pages.

Stewart, Tony; "The Document as Application: Issues and Implications" GCA XML Europe 1999; pp. 575–599.

Franklin, Keith; "Supercharge Data Binding"; Visual Basic Programmer's Journal, Mar. 2000; 7 pages.

Shapiro, Marc; "A Binding Protocol for Distributed Shared Objects" Presented at 14th International Conference on Distributed Comp. Sys.; Jun. 21–24, 1994; 17 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

Marshall, James; "Http Made Really Easy: A Practical Guide to Writing Clients and Servers"; Aug. 15, 1997; 14 pages.

Chapter 3, "Mechanics of Developing JavaScript Applications"; Server–Side Javascript Guide; Online! 1999; pp 51–108 www.developer.netscape.com/docs/mauals/ssjs/1_4/ssjs.pdf.

Chapter 6, "Session Management Service", Server Side Javascript Guide; Online! 1999 pp 125–166 www.developer.netscape.com/docs/manuals/ssjs/1_4/ssjs.pdf.

Custer, Helen; "Inside Windows NT"; Microsoft Press 1993; pp. 74–81.

Davulcu, Hasan; Freire, Juliana; Kifer, Michael; Ramakrishnan, I.V.; "A Layered Architecture for Querying Dynamic Web Content"; ACM 1999; pp. 491–502.

Dowd, Tyson et al., "Compiling Mercury to the .NET Common Language Runtime," Electronic Notes in Theoretical Computer Sciences 59 No. 1 (Netherlands) (2001), pp. 1–16.

Frost, Jim: "Windows NT Security"; May 4, 1995; 7 pages; http://world.std.com/–jimf/papers/nt–security/nt–security.html.

Hannay, Phillip et al., "MSIL For the .NET Framework: The Next Battleground?", Virus Bulletin Conference, Sep. 2001, pp. 173–196.

Holmes, John W.; e–Mail response to question regarding GET/POST.HTTP request, extracted from GOOGLE's News Group, php.general, Nov. 11, 2002.

Kitayama, Fumihiko; Hirose, Shin–Ichi; Kondoh, Goh; Kuse, Kazushi; "Design of a Framework for Dynamic Content Adaptation to Web–Enabled Terminals and Enterprise Applications"; IEEE 1999, pp. 72–79.

Langheinrich, M., et al., "Unintrusive customization techniques for Web advertising," Computer Networks, vol. 31, No. 11–16. May 17, 1999, pp. 1259–1272.

Lee, C.–H., et al., "Web personalization expert with combining collaborative filtering and association rule mining technique," Expert Systems With Applications, vol. 21, No. 3, Oct. 2001, pp. 131–137.

Li, W.–S., et al., "PowerBookmarks: a system for personalizable Web information organization, sharing, and management,"Computer Networks, vol. 31, No. 11–16, May 17, 1999, pp. 1375–1389.

Mobasher, B., "A Web personalization Engine Based on User Transaction Clustering," Proc. Of the 9th Annual Workshop on Information Tech. And Systems, Dec. 11, 1999, pp. 179–184.

"NCSA httpd" nttpd@ncsa.uiuc.edu.

O'Leary, M., "Web personalization Does It Your Way," O'Leary Online, vol. 23, No. 2, Mar.–Apr. 1999, pp. 79–80.

Pyarali, Irfan; O'Ryan, Carlos; Schmidt, Douglas; Wang, Nanbor; Gokhale, Aniruddha S.; Kachroo, Vishal; "Using Priciple Patterns to Optimize Real–Time ORB's" IEEE Concurrency, 2000, pp. 16–25.

Ramakrishnan, N., "PIPE: Web Personalization by Partial Evaluation," IEEE Internet Computing, vol. 4, No. 6, Nov.–Dec. 2000, pp. 21–31.

Seddon, Bill, "Generating XP Style webparts from a web control," The Code Project–Generating XP style webparts from a web control–ASP.NET, online at http://www-.codeproject.com/aspnet/webpartscontrol.asp, retrieved Apr. 8, 2004, 10 pages.

Sells, Chris et al., "Generating Code at Run Time with Reflection.Emit," Windows Developer Magazine, Aug. 2002, vol. 13, No. 8, pp. 26–34.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310–319.

Syme, Don, "ILX: Extending the .NET Common IL for Functional Language Interoperability," Electronic Notes in Theoretical Computer Science 59 No. 1 (2001), pp. 1–20.

Varela, Carlos A.; Caroline C. Haynes; "Providing Data on the Web: From Examples to Programs," Second International WWW Conference, Chicago, IL; Oct. 17, 1994; 17 pages.

* cited by examiner

500

```
(1)     namespace System.Web.UI
(2)     {
(3)         public interface IValidator
(4)         {
(5)             // Properties
(6)             public Boolean    IsValid          {get;set;}
(7)             public String     ErrorMessage     {get;set;}
(8)
(9)             // Methods
(10)            public void       Validate();
(11)        }
(12)    }
```

FIG. 5

```
(1)     namespace System.Web.UI
(2)     {
(3)          [AttributeUsage(AttributeTargets.Class)]
(4)          public class ValidationProperty : Attribute
(5)          {
(6)               // Properties
(7)               public String       ValidationProperty  {get;}
(8)
(9)               // Constructor
(10)              public       ValidationProperty(String propertyName);
(11)         }
(12)    }
```

700

```
(1)    namespace System.Web.UI
(2)    {
(3)        public class Page : TemplateControl
(4)        {
(5)            // Properties
(6)            public Boolean            IsValid         {get;}
(7)            public ValidatorCollection Validators     {get;}
(8)        }
(9)    }
```

```
(1)    namespace System.Web.UI
(2)    {
(3)            public class BaseValidator : Label, IValidator
(4)            {
(5)                    // Properties
(6)                    public String            ControlToValidate    {get; set;}
(7)                    public Boolean           IsValid              {get; set;}
(8)                    public String            ErrorMessage         {get; set;}
(9)                    public ValidatorDisplay  Display              {get; set;}
(10)                   public String            Text                 {get; set;}
(11)                   Public Boolean           EnableClientScript   {get; set;}
(12)
(13)                   // Methods
(14)                   public void              Validate();
(15)           }
(16)
(17)           public enum ValidatorDisplay
(18)           {
(19)                   None = 0;    // Validator is always invisible; used when the error
(20)                                // message is only shown in a ValidationSummary
(21)                   Static = 1;' // Validator takes up space even when hidden
(22)                   Dynamic = 2;// Validator takes up space only when visible
(23)           }
(24)   }
```

FIG. 8

```
(1)    namespace System.Web.UI
(2)    {
(3)        public class RegularExpressionValidator : BaseValidator
(4)        {
(5)            //  Properties
(6)            public String      ValidationExpression    {get;set;}
(7)        }
(9)    }
```

```
(1)   namespace System.Web.UI
(2)   {
(3)         public class RequiredFieldValidator : BaseValidator
(4)         {
(5)               // Properties
(6)               public String      InitialValue   {get;set;}
(7)         }
(9)   }
```

```
(1)   namespace System.Web.UI
(2)   {
(3)       public class CompareValidator : BaseValidator
(4)       {
(5)           // Properties
(6)           public ValidationDataType        Type             {get; set;}
(7)           public ValidationCompareOperator Operator         {get; set;}
(8)           public String                    ControlToCompare {get; set;}
(9)           public String                    ValueToCompare   {get; set;]
(10)
(11)      }
(12)      public enum ValidationComparisonOperator
(13)      {
(14)          Equal = 0,
(15)          NotEqual = 1,
(16)          GreaterThan = 2,
(17)          GreaterThanEqual = 3,
(18)          LessThan = 4,
(19)          LesserThanEqual = 5,
(20)          DataTyhpeCheck = 6,
(21)      }
(22)      public enum ValidationDataType
(23)      {
(24)          String = 0,
(25)          Integer = 1,
(26)          Double = 2,
(27)          Date = 3,
(28)          Currency = 4,
(29)      }
(30)  }
```

FIG. 11

```
(1)     namespace System.Web.UI
(2)     {
(3)             public class RangeValidator : BaseValidator
(4)             {
(5)                     // Properties
(6)                     public ValidationDataType    Type            {get;set;}
(7)                     public String                MinimumControl  {get;set;}
(8)                     public String                MinimumValue    {get;set;}
(9)                     public String                MaximumControl  {get;set;}
(10)                    public String                MaximumValue    {get;set;}
(11)            }
(12)    }
```

```
(1)   namespace System.Web.UI
(2)   {
(3)       public class CustomValidator : BaseValidator
(4)       {
(5)           // Properties
(6)           public String      ClientValidationFunction   {get;set;}
(7)           public Event void  OnServerValidationFunction(Object Source,
                                 ServerValidateEventArgs Value)     {get; set;}
(8)       }
(9)
(10)      public class ServerValidateEventArgs: EventArgs
(11)      {
(12)          public ServerValidateEventArgs(string value, Boolean isValid);
(13)          public String  Value {get;}
(14)          public Boolean IsValid {get;set;}
(15)      }
(16)  }
```

```
(1)    namespace System.Web.UI
(2)    {
(3)        public class ValidationSummary : WebControl
(4)        {
(5)            // Properties
(6)            public String                         HeaderText    {get; set;}
(7)            public ValidationSummaryDisplayMode   DisplayMode   {get; set;}
(8)            public Boolean                        ShowSummary   {get; set;}
(9)            public Boolean                        ShowMessageBox {get; set;}
(10)       }
(11)       public enum ValidationSummaryDisplayMode
(12)       {
(13)           List = 0;
(14)           BulletList = 1;
(15)           SingleParagraph = 2;
(16)       }
(17)   }
```

FIG. 14

WEB CONTROLS VALIDATION

TECHNICAL FIELD

The invention relates generally to a web server framework, and more particularly to server-side validation objects that cause validation of input data to a web page.

BACKGROUND OF THE INVENTION

Validating user input is a common circumstance in a Web-based application. A Web page typically accepts user input through an on-screen control, such as a text box or a list box. It is often desirable for the input data to be "validated" before being transmitted to a back-end server-side process, such as back-end database application. Validation, for example, may include verifying that a required field is populated or that a proper data format is used in an input control (e.g., a date format).

One existing approach to validation involves sending the input data in an HTTP ("Hyper Text Transfer Protocol") request to the server, where server-side, developer-provided validation program code (e.g., a developed-provided validation routine in a server-side Web application) validates the input data. If an error is detected, the validation program code indicates an error condition to the client in an HTTP response. In no error is detected; the input data may be submitted to the backend server-side process.

A second approach involves client-side, developer-provided validation program code (e.g., a client-side script) that is transmitted to the client with the web page. If an error is detected by the client-side validation program code, an error is displayed to the user and the input data is not sent to the server. If no error is detected, the input data is sent to the server in an HTTP request for processing.

These approaches, however, require a developer to provide custom validation code, which requires a sophisticated understanding of client-side and/or server-side programming. Many web page authors, as distinguished from web developers, lack the programming knowledge required to provide adequate validation of input data. Moreover, server side application developers often lack an intimate understanding of client-side scripting and authoring languages (e.g., HTML).

In addition, it is often desirable to provide both client-side and server-side validation. Client-side validation gives rapid feedback to a user, by avoiding a round-trip to the server. The validation occurs within the browser on the client before submission of an HTTP request to the server. DHTML ("Dynamic Hyper Text Markup Language") and scripting languages provide improved capabilities of client-side validation over standard HTML (Hyper Text Markup Language); however, more sophisticated coding is often required. In addition, once input data is validated on the client, a web application must still re-validate the information on the server to capture intentionally or inadvertently corrupted input data received from clients (e.g., such as clients that lack a required client-scripting environment). Therefore, much of the client-side validation logic must still be duplicated on the server.

SUMMARY OF THE INVENTION

Embodiments of the present invention solve the discussed problems by replacing developer-provided validation program code with one or more validator declarations that are included in a server-side data store, such as an Active Server Page (ASP) file, by the web page author. The validator declarations define server-side validation objects that process the input data from the web page and provide appropriate error handling in the event of an input data error. Parameters in the validator declarations can specify the validation criteria against which the input data is validated. Example validation operations involve regular expressions, required fields, data comparison, range comparison and custom validation.

In addition, attributes can specify either server-side validation or client-side validation, depending on the client browser's capabilities. In a server-side scenario, a validation object can process the input data received in an HTTP request from the client. In a client-side scenario, a validation object can render the appropriate client-side code (i.e., client-side scripting language code) to validate the input data without a round trip between the client and the server. Typically, input data validated by client-side validation is also validated on the server in order to prevent receipt of invalid data by the back-end server processes. In an embodiment of the present invention, a validation object declared to provide server-side validation automatically provides the redundant client-side validation logic as well.

A validation object can generate an appropriate validation response to the end user. In a server-side validation scenario, the validation response is rendered into authoring language data that is sent to the client in an HTTP response. In a client-side scenario, the validation object renders the appropriate client-side code to respond to a validation error with an appropriate error message or response. In addition; a validation summary object can provide a validation summary that displays the validation errors in summary form for all the validation objects associated with a Web page.

In an implementation of the present invention, a method of validating input data received through at least one client-side input control element in a Web page is provided. Each client-side input control element is associated with a server-side input control object declared in a server-side resource. A validator declaration in the server-side resource is detected. The validator declaration is associated with a server-side input control object. A server-side validation object having a validation criterion is generated, responsive to the detecting operation. At least a portion of the input data is evaluated to determine whether the portion of the input data satisfies the validation criterion. The portion of the input data is received through the client-side input control element associated with the server-side input control object.

In another implementation of the present invention, a server-side validation object for validating input data that is input through at least one client-side input control element in a Web page is provided. Each client-side input control element is associated with a server-side input control object declared in a server-side resource. A control identifier identifies the server-side input control object with which the server-side validation object is associated. At least a portion of the input data is received into a property of the server-side input control object. A validation criterion is used to evaluate the portion of the input data stored in the property of the server-side input control object. A validity indicator indicates whether the portion of the input data satisfies the validation criterion.

In other implementations of the present invention, articles of manufacture are provided as computer program products. One embodiment of a computer program product provides a computer program storage medium readable by a computer system and encoding a computer program for executing a computer process that validates input data received through at least one client-side input control element in a Web page, each client-side input control element being associated with a server-side input control object declared in a server-side resource. Another embodiment of a computer program product may be provided in a computer data signal embodied in a carrier wave by a computing system and encoding the computer program that validates input data received through at least one client-side input control element in a Web page, each client-side input control element being associated with a server-side input control object declared in a server-side resource.

The computer program product encodes a computer program for executing on a computer system a computer process for validating input data received through at least one client-side input control element in a Web page, each client-side input control element being associated with a server-side input control object declared in a server-side resource is provided. A validator declaration is detected in the server-side resource. The validator declaration is associated with a server-side input control object. A server-side validation object having a validation criterion is generated, responsive to the detecting operation. At least a portion of the input data is evaluated to determine whether the portion of the input data satisfies the validation criterion. The portion of the input data is received through the client-side input control element associated with the server-side input control object.

These and various other features as well as other advantages, which characterize the present invention, will be apparent from a reading of the following detailed description and a review of the associated drawings.

BRIEF DESCRIPTION OF THE DRAWINGS

FIG. 5 illustrates an exemplary IValidator interface in an embodiment of the present invention.

FIG. 7 illustrates an exemplary container including a ValidatorCollection defined in a page object associated with a Web page in an embodiment of the present invention.

FIG. 8 illustrates an exemplary BaseValidator class in an embodiment of the present invention.

FIG. 9 illustrates the structure of a RegularExpressionValidator in an embodiment of the present invention.

FIG. 10 illustrates the structure of a RequiredFieldValidator in an embodiment of the present invention.

FIG. 11 illustrates the structure of a CompareValidator in an embodiment of the present invention.

FIG. 12 illustrates the structure of a RangeValidator in an embodiment of the present invention.

FIG. 13 illustrates the structure of a CustomValidator in an embodiment of the present invention.

FIG. 14 illustrates the structure of a ValidationSummary object in an embodiment of the present invention.

DETAILED DESCRIPTION OF THE INVENTION

In an embodiment of the present invention, input data validation is defined using one or more validator declarations that are included in a dynamic content resource (e.g., an ASP+ file) by the web page author. The validator declarations specify server-side validation objects that validate the input data received in the web page and provide appropriate error handling in the event of an input data validation failure. The validation objects are created within a server-side control object hierarchy, which may be responsible for processing received input data, handling Web page events, and rendering HTML data for transmission to the client. This process may be referred to as dynamic Web page generation.

Parameters in the validator declarations can specify the validation criteria against which the input data is validated. Example validation operations involve regular expressions, required fields, typed data comparison, range comparison and custom validation. In an embodiment of the present invention, each type of validation criterion is applied by a specific type of validation object, wherein each validation object class is inherited from a BaseValidator class and supports a standard IValidator interface.

Validation parameters can also specify either server-side validation or client-side validation, depending on the client browser's capabilities. In a server-side scenario, a server-side validation object can process the input data received in an HTTP request from the client. In a client-side scenario, a server-side validation object can render the appropriate client-side code (i.e., client-side scripting language code) to validate the input data without a round trip between the client and the server. Typically, input data validated by client-side validation is also validated on the server in order to prevent receipt of invalid data by the back-end server processes. In an embodiment of the present invention, a validation object declared to provide client-side validation automatically provides the redundant server-side validation as well.

Figure 1:
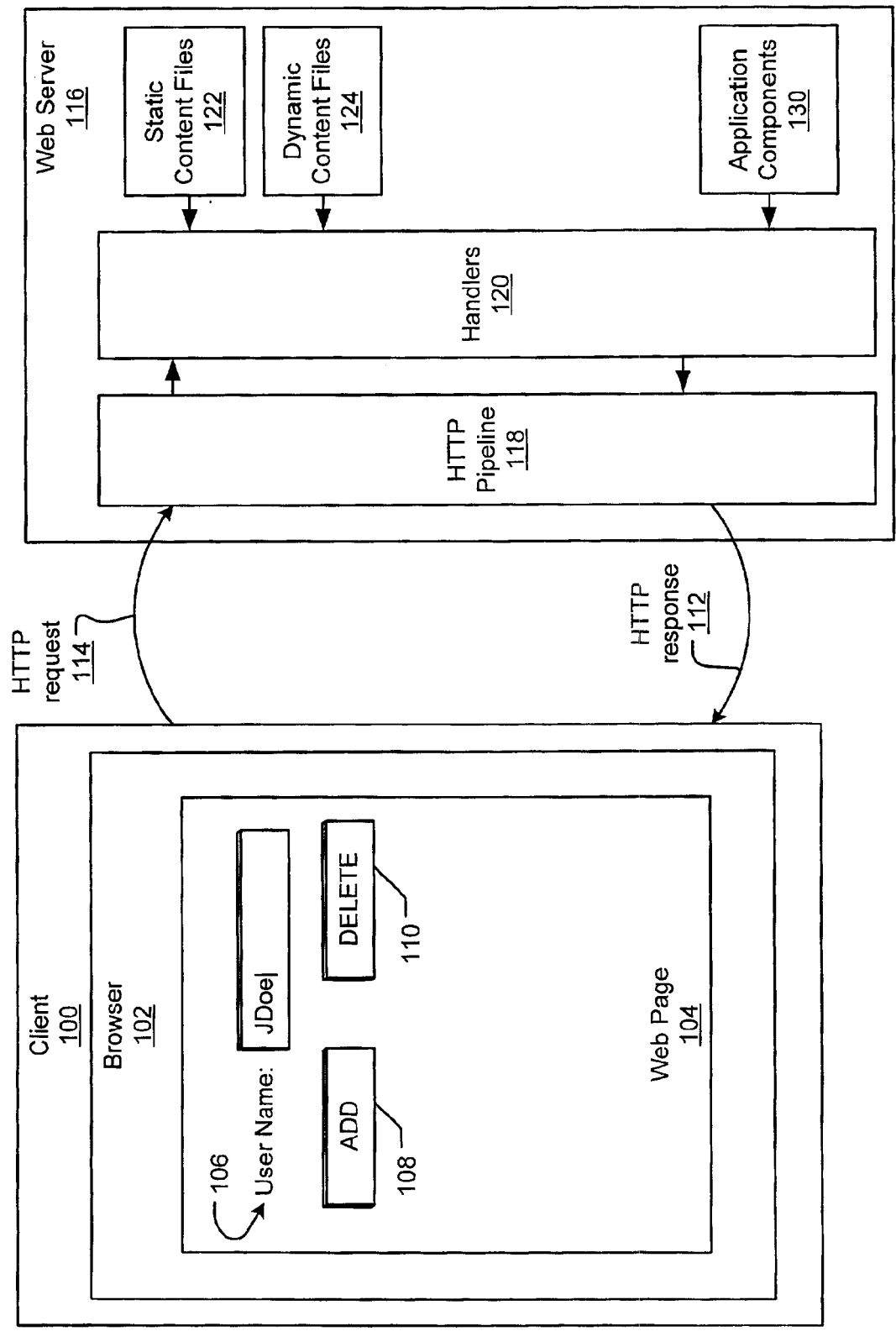
FIG. 1 illustrates a web server for dynamically generating web page content for display on a client in an embodiment of the present invention.

FIG. 1 illustrates a web server for dynamically generating web page content for display on a client in an embodiment of the present invention. A client 100 executes a browser 102 that displays a web page 104 on a display device of the client 100. The client 100 may include a client computer system having a display device, such as a video monitor. An "INTERNET EXPLORER" browser, marketed by Microsoft Corporation, is an example of a browser 102 in an embodiment of the present invention. Other exemplary browsers include without limitation "NETSCAPE NAVIGATOR" and "OPERA". The exemplary web page 104 incorporates a text box ("textbox") control element 106 and two button control elements 108 and 110. The browser 102 may receive HTML code in an HTTP response 112 from a web server 116 and displays the web page as described by the HTML code. Although HTML is described with reference to one embodiment, other authoring languages, including without limitation SGML (Standard Generalized Markup Language), XML (extensible Markup Language), and WML (Wireless Markup Language), which is an XML-based markup language, designed for specifying the content and user interfaces of narrowband wireless devices, such as pagers and cellular phones, are contemplated within the scope of the present invention.

The communications between the client 100 and the web server 116 may be conducted using a sequence of HTTP requests 114 and HTTP responses 112. Although HTTP is described with reference to one embodiment, other transport protocols, including without limitation S-HTTP, are contemplated within the scope of the present invention. On the web server 116, an HTTP pipeline module 118 receives an HTTP request 114, resolves the URL, and invokes an appropriate handler 120 for processing the request. In an embodiment of the present invention, a plurality of handlers 120 to handle requests for different types of resources is provided on the web server 116.

For example, if the URL specifies a static content resource 122, such as an HTML file, a handler 120 accesses the static content resource 122 and passes the static content resource 122 back through the HTTP pipeline 118 for communication to the client 100 in an HTTP response 112. Alternatively, in an embodiment of the present invention, if the URL specifies a dynamic content resource 124, such as an ASP+ resource, a handler 120 accesses the dynamic content resource 124, processes the contents of the dynamic content resource 124, and generates the resulting HTML code for the web page 104. Generally, a dynamic content resource is a server-side declaration datastore (e.g., an ASP+ resource) that can be used to dynamically generate the authoring language code that describes a web page to be displayed on a client. The HTML code for the web page is then passed through the HTTP pipeline 118 for communication to the client 100 in the HTTP response 112. A server-side control object in an embodiment of the present invention, being declared in a dynamic content resource 124, logically corresponds to a user interface element that is displayed on the client.

A handler 120 also has access to one or more non-user-interface server components 130 that execute on the web server 116 or on another accessible web server. A non-user-interface server component 130 provides logic for server-side processes, such as a stock price look-up application or database component, and may be referenced in or associated with a dynamic content resource 124 that is processed by a handler 120. Server-side events raised by the control objects declared in the dynamic content resource 124 may be processed by server-side code, which calls appropriate methods in the non-user-interface server component 130. As a result, the processing provided by the server-side control objects simplifies the programming of the non-user-interface server component 130 by encapsulating the processing and generation of the user interface elements of a web page, which allows the developer of the non-user-interface server component 130 to concentrate on the specific functionality of the application, rather than on user interface issues.

In an embodiment of the present invention, a validation object is a type of server-side control that can check an input control (e.g., a web control) for a specific type of error condition. A validation object can also cause a description of the error condition to be displayed to the user on the client. Exemplary validation objects (i.e., validators) are described in Table 1, although other validation objects are contemplated within the scope of the present invention.

TABLE 1

Exemplary Validation Objects

| Exemplary validator types | Description |
| --- | --- |
| RequiredFieldValidator | Enforces selection of a required control (e.g., a list box) or input into a required control (e.g., a text box) |
| RegularExpressionValidator | Enforces user input that matches a provided regular expression format (e.g., a date format) |
| CompareValidator | Enforces a comparison condition between an input control value and a predetermined value or a value of another input control |
| RangeValidator | Enforces a range condition between two predetermined values, the values of two other input controls, or a combination thereof |
| CustomValidator | Enforces a customized validation condition |
| ValidationSummary | Provides a summary of the validation conditions on a given web page |

Figure 2:
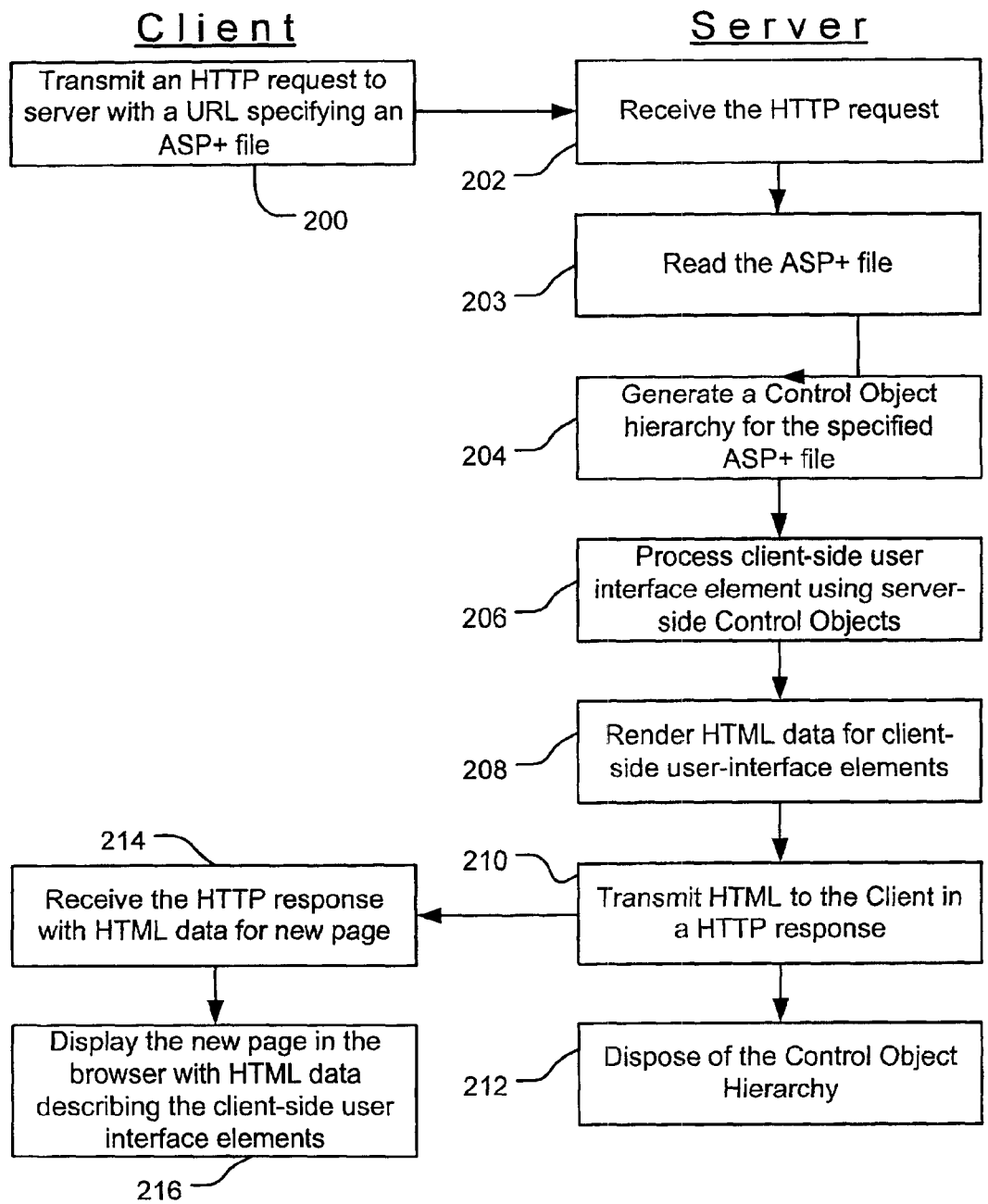
FIG. 2 illustrates operations for processing and generating client-side user interface elements using server-side control objects in an embodiment of the present invention.

FIG. 2 illustrates a flow diagram of operations for processing and generating client-side user interface elements using server-side control objects in an embodiment of the present invention. In operation 200, the client transmits an HTTP request to the server. The HTTP request includes a URL that specifies a resource, such as an ASP+ resource. In operation 202, the server receives the HTTP request and invokes the appropriate handler for processing the specified resource. The dynamic content resource (e.g., the ASP+ resource) is read in operation 203. Operation 204 detects validator declarations within the dynamic content resource and generates a server-side control object hierarchy based on the contents of the specified dynamic content resource.

In operation 206, the server-side control objects of the control object hierarchy perform one or more of the following operations: postback event handling, postback data handling, state management, and data binding. Postback events and data (collectively "postback input") from user interface elements are communicated from the client to the server for processing. A postback event, for example, may include without limitation a "mouse click" event from a client-side button element or a "data change" event from a client-side textbox element that is communicated to the server. Postback data, for example, may include without limitation text entered by a user in a text box element or an index of an item selected from a drop-down box. A postback operation, however, may result from other events, and not just from user interaction.

In operation 208, each server-side control object in the control object hierarchy is called to generate (or render) data, such as HTML code, for display of client-side user interface elements in the web page. Note that, although the term "render" may be used to describe the operation of displaying graphics on a user interface, the term "render" is also used herein to describe the operation of generating authoring language data that can be interpreted by client-application, such as a browser, for display and client-side functionality. In one embodiment, calls to render( ) methods in individual control objects are performed using a tree traversal sequence. That is, a call to the renders method of a page object results in recursive traversal throughout appropriate server-side control objects in the control object hierarchy. Alternative methods for calling the render( ) methods for appropriate control objects may also be employed, including an event signaling or object registration approach.

The parentheses designate the "render( )" label as indicating a method, as compared to a data property.

Operation 210 transmits the HTML code to the client in an HTTP response. In operation 214, the client receives the HTML code associated with a new web page to be displayed. In operation 216, the client system incorporates (e.g., displays) the user interface elements of the new page in accordance with the HTML code received from the HTTP response. It should be understood, however, that incorporation of a user-interface element may include non-display operations, such as providing audio or tactile output, reading and writing to memory, controlling the operation of scripts, etc. In operation 212, the server-side control object hierarchy is terminated. In an embodiment of the present invention, server-side control objects in the control object hierarchy are created in response to an HTTP request referencing an associated ASP+ resource, and destroyed or terminated subsequent to the rendering of authoring language data (e.g., HTML data). In an alternative embodiment, operation 212 may be performed after operation 208 and before operation 210.

Figure 3:
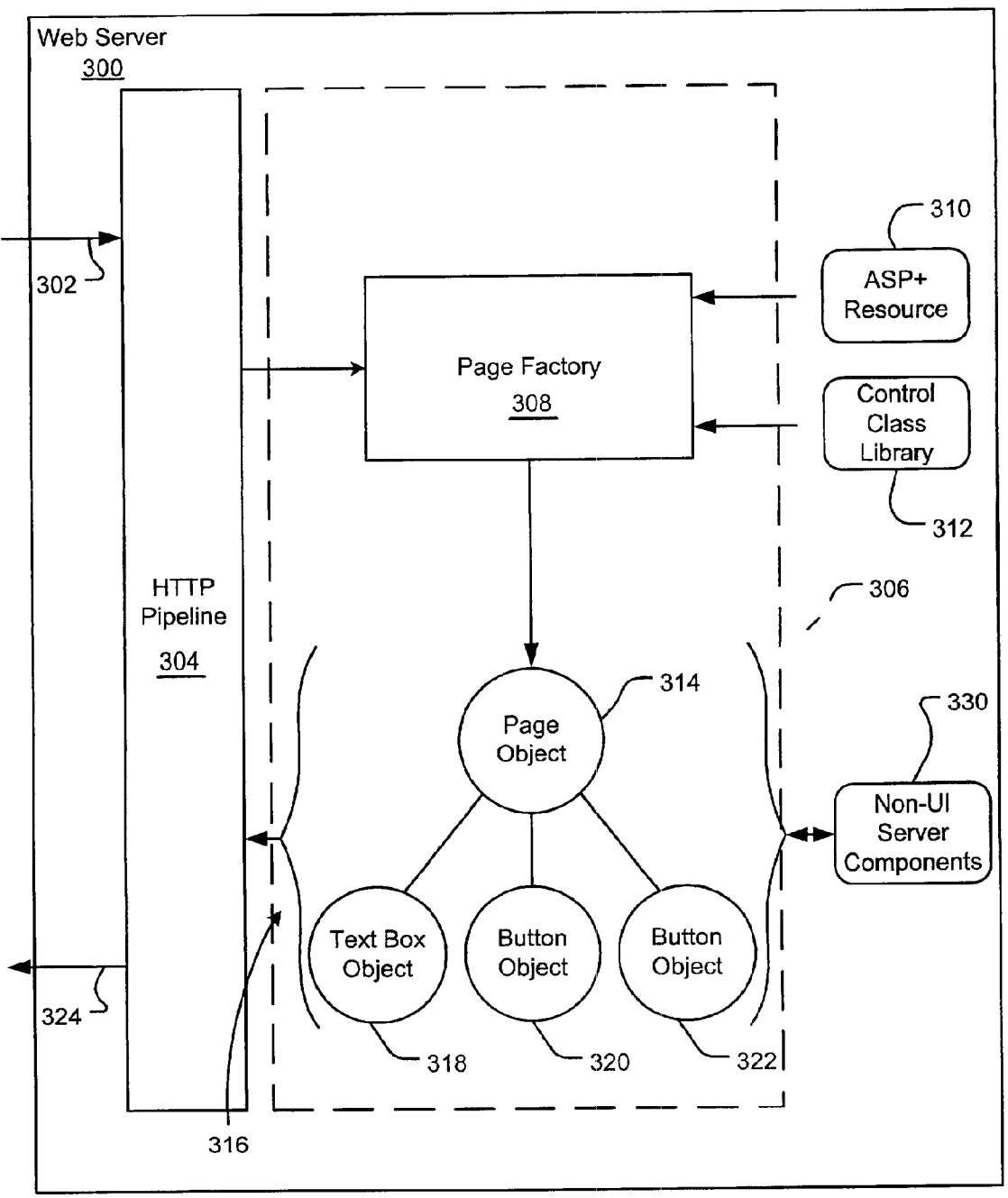
FIG. 3 illustrates exemplary modules in a web server used in an embodiment of the present invention.

FIG. 3 illustrates exemplary modules in a web server used in an embodiment of the present invention. The web server 300 receives an HTTP request 302 into the HTTP pipeline 304. The HTTP pipeline 304 may include various modules, such as modules for logging of web page statistics, user authentication, user authorization, and output caching of web pages. Each incoming HTTP request 302 received by the web server 300 is ultimately processed by a specific instance of an IHTTPHandler class (shown as handler 306). The IHTTP prefix indicates that the class is an Interface of an HTTP handler. The handler 306 resolves the URL request and invokes an appropriate handler factory (e.g., a page factory module 308).

In FIG. 3, a page factory module 308 associated with the ASP+ resource 310 is invoked to handle the instantiation and configuration of the objects declared in the ASP+ resource 310. In one embodiment, an ASP+ resource can be identified or referenced by designating a particular suffix (or file extension such as ".aspx") with a file. When a request for a given ".aspx" resource is first received by the page factory module 308, the page factory module 308 searches the file system for the appropriate file (e.g., the .aspx file 310). The file may contain text (e.g., authoring language data) or data in another format (e.g., bytecode data or encoded data) that may later be interpreted or accessed by the server to service the request. If the physical file exists, the page factory module 308 opens the file and reads the file into memory. If the file cannot be found, the page factory module 308 returns an appropriate "file not found" error message.

After reading the ASP+ resource 310 into memory, the page factory module 308 processes the file content to build a data model of the page (e.g., lists of script blocks, directives, static text regions, hierarchical server-side control objects, server-side control properties, etc.). The data model is used to generate a source listing of a new object class, such as a COM+ ("Component Object Model+") class that extends the page base class. The page base class includes code that defines the structure, properties, and functionality of a basic page object. The source listing is then dynamically compiled into an intermediate language. An intermediate language may include general or custom-built language code, such as COM+ IL code, Java bytecodes, Modula 3 code, SmallTalk code, and Visual Basic code. In an alternative embodiment, the intermediate language operations may be omitted, so that the native instructions are generated directly from the source listing or the source file (e.g., the ASP+ resource 310). A control class library 312 may be accessed by the page factory module 308 to obtain predefined server-side control classes used in the generation of the control object hierarchy.

The page factory module 308 outputs a page object 314, which is a server-side control object that corresponds to the web page 104 of FIG. 1. The page object 314 and its children (i.e., a text box object 318, a button object 320, and another button object 322) comprise an exemplary control object hierarchy 316. Other exemplary control objects are also contemplated in accordance with the present invention. The page object 314 logically corresponds to the web page 104 or FIG. 1. The text box object 318 corresponds to the text box 106 in FIG. 1. Likewise, the button object 320 corresponds to the add button 108 in FIG. 1, and the button object 322 corresponds to the delete button 110 in FIG. 1. The page object 314 is hierarchically related to other control objects on the server. In one embodiment, a page object is a container object that hierarchically contains its children control objects. In an alternative embodiment, other forms of hierarchical relation may be employed, including a dependency relationship. In a more complex control object hierarchy with multiple levels of children, a child object can be a container object for other child objects.

In the illustrated embodiment, the control objects in the control object hierarchy 316 are created and executed on the server 300, and each server-side control object "mirrors" a corresponding user interface element on the client, whether the element is hidden or visible. The server-side control objects of this embodiment also cooperate to handle input from the HTTP request 302, to manage the states of server-side control objects, to perform data binding with server-side databases, and to generate authoring language data (e.g., HTML code) used to display a resulting web page at a client. The resulting authoring language data is generated (i.e., rendered) from the server-side control object hierarchy 316 and transmitted to the client in an HTTP response 324. For example, resulting HTML code may embody any valid HTML construct and may reference ACTIVEX-type controls, JAVA applets, scripts, and any other web resources that yield client-side user interface elements (e.g., control buttons, text boxes, etc.) when processed by a browser.

By virtue of declarations made in the ASP+ resource 310, server-side control objects may access a back-end server process implemented by one or more non-user-interface server components 330. For example, in response to input data, server-side control objects can raise server-side events to the non-user-interface server components registered for those events. In this manner the non-user-interface server component 330 can interact with the end user through user interface elements without programming the code required to display and process these elements.

In one embodiment, validated data is sent to the back-end server process whereas data that fails validation is handled as an error and withheld from the back-end server-side process. For example, the validator returns an error message to the end user and does not allow the server-side control hierarchy to pass the non-validated input data on to the server-side process.

In summary, an embodiment of the present invention includes server-side control objects that are created and executed on the server to generate HTML code that is sent to a client. Validators are examples of server-side control objects. The HTML code may, for example, embody any valid HTML constructs and may reference ACTIVEX-type controls, JAVA applets, scripts and any other web resources to produce user interface buttons and other user interface elements on the client. A user at the client may interact with these user interface elements, which logically correspond to the server-side control objects, and send a request back to the server. The server-side control objects are recreated on the server to process the data, events, and other characteristics of the user interface elements so as to generate the next round of HTML code to be transmitted in a response to the client.

Figure 4:
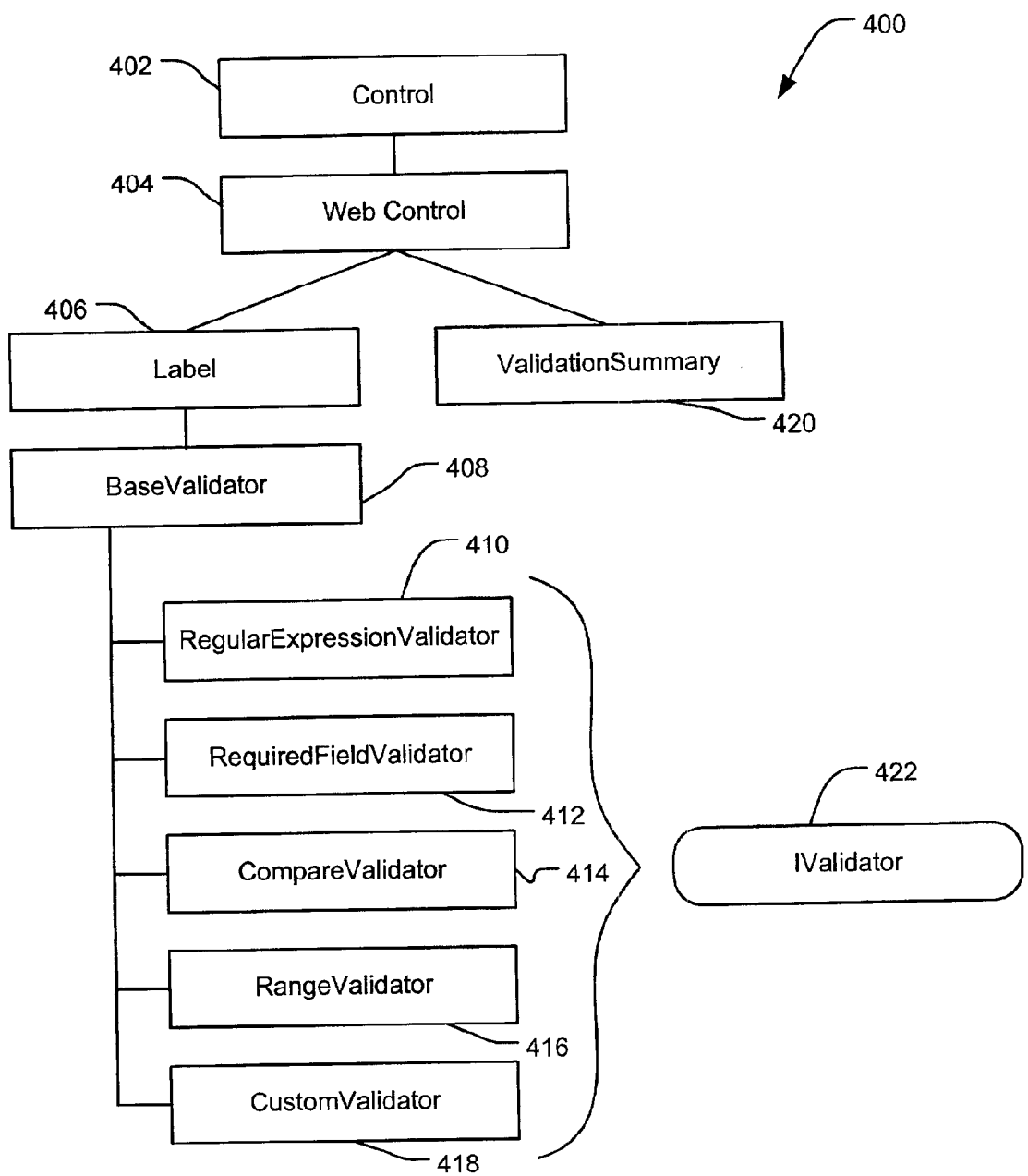
FIG. 4 represents an exemplary class hierarchy of validation object classes in an embodiment of the present invention.

FIG. 4 represents an exemplary class hierarchy 400 of validation object classes in an embodiment of the present invention. It should be understood that other class hierarchies may be employed within the scope of the present invention. Furthermore, while the class hierarchy 400 illustrated in FIG. 4 is described in terms of COM+ controls, embodiments of the present inventions may be implemented without employing a COM+ architecture.

In an embodiment of the present invention, a Control class 402 represents an abstract class for control objects used for dynamically generating web page content. The Control class 402 defines the capabilities of the most basic control object, which contains the logic shared by all control objects to participate in operations 206 (postback event handling, postback data handling, state management, and data binding) and 208 (rendering). Validation objects, as well as other server-side control objects, inherit from the Control class 402.

A WebControl class 404 represents an abstract class for server-side control objects that enable Web page functionality. The WebControl class 404 represents an abstract class for server-side controls that render (operation 208) conditionally, based upon the capabilities of the client. In an embodiment of the present invention, the rendered output of the WebControl class 404 includes DHTML and client-side script for clients that support these features. A Label class 406, which derives from the WebControl class 404, renders formatted text within a Web page.

A BaseValidator class 408 provides base properties and functionality for many of the validation objects in an embodiment of the present invention. See also FIG. 8 and the description associated therewith. In FIG. 4, several validation objects are inherited from the BaseValidator class 408, including a RegularExpressionValidator class 410, a RequiredFieldValidator class 412, a CompareValidator class 414, a RangeValidator class 416, and a CustomValidator class 418. See also FIGS. 9 to 13 and the description associated therewith. Each of the validator class illustrated as inheriting from the BaseValidator class supports an IValidator interface 422, which provides a standard interface to such validators. An exemplary IValidator interface is illustrated and described with regard to FIG. 5. A validation object may be associated with a server-side input control object, which is in turn associated with a client-side input control element, such as a text box.

In an alternative embodiment of the present invention, an additional base class called BaseCompareValidator is employed. The BaseCompareValidator class inherits from the BaseValidator class and is the parent of the CompareValidator and RangeValidator classes, thereby consolidating some common code (i.e., common to the CompareValidator and RangeValidator classes) into the BaseCompareValidator class.

Embodiments of the present invention can support both client-side and server-side validation. Server-side validation is desirable to protect the back-end server processes from invalid input data. Server-side validation is preferred even when client-side validation is also provided. Client-side validation provides quick response for validation errors to an end user without a round-trip to the server. Accordingly, client-side validation may be used in combination with server-side validation to improve the end user experience.

In one embodiment of the present invention, both server-side validation and client side validation are automatically implemented by each validator, on the basis of the validator declarations in the dynamic content resource. However, some browsers do not support scripting functionality that is used to provide client-side validation functionality. As such, in an embodiment of the present invention, client-side validation may be prevented or turned off for such browsers.

FIG. 5 illustrates an exemplary IValidator interface 500 in an embodiment of the present invention. An IValidator interface is an abstract interface that is characteristic of a validation object (i.e., a validator) in an embodiment of the present invention. Validation objects perform validation when the object's Validate( ) method is called. In one embodiment of the present invention, the Validate( ) method is called by the developer whenever a property that affects the validation state of the associated input control element is changed.

The IValidator interface 400 of FIG. 4 defines common properties and methods of validation objects. On line 6, a readable/settable Boolean property, IsValid, is defined. The IsValid property indicates (e.g., TRUE or FALSE) whether a validation test has succeeded within the validation object. On line 7, a readable/settable String property, ErrorMessage, is defined, which stores an error message to be displayed in the event of a validation failure. In one embodiment of the present invention, HTML tags may be included in the ErrorMessage value (e.g., "<b> Error: </b><font color=red> The value entered in the Date textbox does not satisfy the required MM/DD/YYYY format. </font>"). The Validate( ) method on line 10 invokes the validation logic implemented by the specific validation object and causes the updating of the IsValid property.

Figure 6:
FIG. 6 illustrates a ValidationProperty metadata in an embodiment of the present invention.

FIG. 6 illustrates a ValidationProperty metadata in an embodiment of the present invention. Input control objects (e.g., TextBoxes, HtmlTextBoxes, etc. and other web controls) that are to be included in the validation framework define a ValidationProperty metadata. The ValidationProperty identifies the property that an associated validation object will evaluate. The ValidationProperty definition 600 in FIG. 6 defines the structure and functionality associated with a ValidationProperty in an embodiment of the present invention. Line 3 of the example code attaches the ValidationProperty attribute to classes only, not to properties, methods, parameters, assemblies, etc., although in an alternative embodiment, a ValidationProperty can be applied with finer precision (e.g., properties, etc.).

The input control object initializes the ValidationProperty by specifying, via the constructor of line 10, the name of the input control object's property that is to be validated by this validator. For example, a TextBox control object for which input text (i.e., a Text property) is to be validated would include a ValidationProperty, which would be initialized using the constructor on line 10 to specify the input control property's name (i.e., "Text"). The property name is then stored in the ValidationProperty of line 7 to indicate which property of the TextBox control is to be validated.

FIG. 7 illustrates an exemplary container 700 including a ValidatorCollection defined in a page object associated with a Web page in an embodiment of the present invention. The page object acts as an aggregator for validation status. All validators are added to the Page object's Validator collection, thereby making the overall validation status of the page object available. An exemplary embodiment of a Validator collection is defined in an instance of a Page class, which includes a readable Boolean property, IsValid, and a readable ValidatorCollection property, Validators. The IsValid property indicates the overall validation status for the entire page. If any validator in the form has a validation error, the IsValid is FALSE. If all validators in the page are not in error, then IsValid is TRUE. Accordingly, the ValidatorCollection class and IsValid property provide an access window into the validation characteristics of a page.

FIG. 8 illustrates an exemplary BaseValidator class in an embodiment of the present invention. The BaseValidator class 800 defines a core implementation of validation objects in one embodiment of the present invention. It should be understood, however, that validation objects may involve alternative implementations within the scope of the present invention.

On line 3, the BaseValidator class 800 is defined as inheriting from the Label class and providing the IValidator interface. A readable/settable String property, ControlToValidate, stores the ID (identifier) of the input control object associated with the validation object. As discussed, various embodiment of the present invention provide validation objects for validating input data entered through an associated input control element on a Web page. Via the ControlToValidate property, a validation object may be associated with a given input control object via the input control object's ID. Thus, multiple validation objects may reference the same input control object ID, thereby combining multiple validation criteria for the single input control element. By combining multiple validation objects with a single input control object, Web page authors can easily customize the validation logic that is applied to each input control element in a Web page.

For example, a Web page author may determine that a TextBox input control element requires that input data be provided in a date format, having a value between Jan. 1, 2000 and Jan. 1, 2001. Accordingly, the Web page author may associate a RegularExpressionValidator object with the TextBox input control object to enforce the date format and a RangeValidator object to enforce the valid range for the input data. If the date is required to be entered into the TextBox input control element in order for the Web page data to be valid, the Web page author may also associate a RequiredFieldValidator object to enforce this requirement.

As indicated on line 3, the BaseValidator class 800 provides the IValidator interface. On line 7, a readable/settable Boolean property, IsValid, is defined. Likewise, on line 8, a readable/settable String property, ErrorMessage is defined. Also, on line 14, the method Validate( ) is defined. Each of these three elements of the BaseValidator class 800 is defined in accordance with the IValidator interface described in FIG. 5. On line 11, a readable/settable Boolean property, EnableClientScript, is defined, which can be used to enable or disable client-side script on an individual control basis.

The BaseValidator class 800 also defines additional properties, including the Text and Display properties. On line 10, a readable/settable String property, Text, defines the internal contents of the validator, which are displayed if the validation fails. On line 9, a readable/settable ValidatorDisplay property, Display, defines the validator's display behavior. As indicated by the ValidatorDisplay definition in lines 17–23, the Display property may store a value indicating that the internal contents of the validator should be invisible, static, or dynamic. "None" indicates that the validator contents are not displayed inline (i.e., in visible page layout). In this mode, a Web page author may show an error message only in a validation summary. See the discussion of FIG. 14. "Static" indicates that the validator contents are displayed in the page layout if the validation fails, but that the validator contents also take up space in the page layout, even if the validator contents are hidden. Accordingly, the page layout does not change when the validator contents becomes visible (e.g., after a validation failure). Furthermore, the contents of multiple validators for the same input control occupy different physical locations in the page layout. In contrast, "dynamic" indicates that the validator contents do not take up space in the page layout unless it is displayed and that the validator contents are displayed only if the validation fails. The dynamic nature of this display mode causes the page layout to shift to accommodate the newly displayed contents of the validator.

Validation objects include a generation module responsible for implementing the server-side validation logic and/or the client-side validation logic. On the server, the generation module implements server-executed code that evaluates a portion of the input data on the basis of a validation criterion. On the client, the generation module renders client-executed code (e.g., a script) that evaluates a portion of the input data on the basis if a validation criterion. This evaluation occurs on the client in response to the inputting of the input data into the client-side input control element (e.g., in response to the "SUBMIT" operation on the client). Furthermore, in an embodiment of the present invention, the client-side validation object validates the input data before the input data is transmitted to the server.

FIG. 9 illustrates the structure of a RegularExpressionValidator in an embodiment of the present invention. A RegularExpressionValidator 900 provides validation using a regular expression as a validation criterion. The RegularExpressionValidator 900 inherits from the BaseValidator class and provides an IValidator interface. A regular expression is a representation that defines a specified pattern against which text is evaluated. For example, a regular expression "*.doc" may be used to search for all documents in a directory, where '*' represents a wildcard that matches zero or more characters in any pattern. As such, all files ending in ".doc" would match the "*.doc" regular expression. Another exemplary regular expression is "??/??/????", which specified a date format having a four digit year field. The'?' symbol represents a wildcard matching any single character. The regular expression examples discussed herein are not intended to limit the scope of the present invention, and it should be understood that any form of regular expression may be implemented in a RegularExpressionValidator in accordance with the present invention.

On line 6, a readable/settable property, ValidationExpression, stores a regular expression (as a validation criterion) against which the input control property (e.g., the Text property for a TextBox control) is evaluated. Validation fails if the input control property does not match the pattern specified in the regular expression.

An excerpt of an exemplary declaration for a web page having a RegularExpressionValidator associated with a textbox is shown below:

```
(1) <input id=Text1 type=text runat="server">
(2) <asp:RegularExpressionValidator id="r1" runat="server"
    ControlToValidate="Text1" ValidationExpression="^[\w-]+
    @[\w-]+\.(com|net|org|edu|mil)$">
    Please enter a valid e-mail address
(3) </asp:RegularExpressionValidator>
```

The associated input control object (i.e., a textbox object) is declared in line (1). The RegularExpressionValidator is declared in lines (2)–(3). The "id" property defines an identifier of the validator itself ("r1"). The "runat" property specifies that the validator be implemented as a server-side control (which nevertheless can generate both server-side and client-side validation logic). The "ControlToValidate" property associates the "r1" validator with the Text1 textbox declared in line (1). The "ValidationExpression" specifies the regular expression against which the input data is evaluated, using well known regular expression notation. The text "Please enter a valid e-mail address" represents the contents of the validator, which is displayed at the location of the validator in the Web page to indicate an error condition if the validation fails.

FIG. 10 illustrates the structure of a RequiredFieldValidator in an embodiment of the present invention. A RequiredFieldValidator 1000 provides validation using a required field indication as a validation criterion. The RequiredFieldValidator 1000 inherits from the BaseValidator class and provides an IValidator interface. On line 6, a readable/settable String property, InitialValue, stores an initial value of the input control property. Validation fails if, after receiving the HTTP request from the client, the input control property (i.e., the require field) is not different than (i.e., not change from) the initial value property of the RequiredFieldValidator 1000. As such, the requirement for input data that differs from the initial constitutes a validation criterion.

The embodiment illustrated in FIG. 10 provides a String value as an initial value. It should be understood that other initial value types may also be employed. For example, in alternative embodiments, an integer may be used as an initial value to specify the initial state of radio buttons, or a bit field may be used as an initial value to specify the initial state of an array of check boxes.

An excerpt of an exemplary declaration for a web page having a RequiredFieldValidator associated with a textbox is shown below:

```
(1) <input id=Text1 type=text runat="server">
(2) <asp:RequiredFieldValidator id=RequiredFieldValidator1 runat=
    "server"
    ErrorMessage="You must enter a value in the first textbox"
    ControlToValidate="Text1" Display="Dynamic">*
(3) </asp:RequiredFieldValidator>
```

The associated input control object (i.e., a textbox object) is declared in line (1). The RequiredFieldValidator is declared in lines (2)–(3). The "id" property defines an identifier of the validator itself. The "runat" property specifies that the validator is implemented as a server-side control (which nevertheless can generate both server-side and client-side validation logic). The "ErrorMessage" property defines the text to be shown (either in the validator's location or in the validation summary) if the validation fails. The "ControlToValidate" property associates the RequiredFieldValidator1 validator with the Text1 textbox declared in line (1). The "Display" property defines the display mode of the validator as "dynamic". The "*" represents the contents of the validator, which is displayed at the location of the validator in the Web page to indicate an error condition if the validation fails.

FIG. 11 illustrates the structure of a CompareValidator in an embodiment of the present invention. A CompareValidator 1100 provides validation using a various comparison operations and a typed comparison value. The CompareValidator 1100 inherits from the BaseValidator class and provides an IValidator interface. The comparison value may be hard coded into the "ValueToCompare" property shown on line 9 or may be input from an input control object specified in the "ControlToCompare" property shown on line 8. A comparison operation and comparison value maybe defined to form a validation criterion. Except for the DataTypeCheck operation, validation fails if the specified comparison of the input control property to the comparison value is FALSE. For the DataTypeCheck operation, validation fails if the input data cannot be converted to the specified ValidationDataType.

On line 6, a readable/settable ValidationDataType property, Type, defines the type of data values to be compared (i.e., the comparison value and the input value of the input control property). The data values are converted into the specified data type before the specified comparison operation (specified on line 7) is performed. In one embodiment of the present invention, validation fails if the conversion of the input data to the specified data type fails. ValidationDataType is defined in lines 22–29.

On line 7, a readable/settable comparison operation, Operator, of type ValidationComparisonOperation is defined. The specified comparison operation is applied against the data values to be compared, after the appropriate data conversions. The type ValidationComparisonOperation is defined in lines 12–21. The DataTypeCheck operation checks to determine whether the input data satisfies the specified data type, whereas the other comparison operations evaluate the input data against the specified comparison value using the specified operation.

On line 8, a readable/settable String property, ControlToCompare, defines the ID of an input control against which to perform the specified comparison operation. The input control properties (as identified by the input control objects' ValidationProperty attributes) of the specified input control object and the current input control object (i.e., the input control object to which the validator is associated) are compared in accordance with the specified comparison operation.

On line 9, a readable/settable String property, ValuetoCompare, defines a hard coded value against which to perform the specified comparison. In one embodiment, if both ControlToCompare and ValueToCompare are populated, then the ControlToCompare input data is used in the comparison operation. However, in an alternative embodiment, the ValueToCompare may be used as the preferred designation instead.

An excerpt of an exemplary declaration for a web page having a CompareValidator associated with a textbox is shown below:

```
(1) <input id=Text1 type=text runat="server">
(2) <asp:CompareValidator id=CompareValidator1 runat="server"
    ErrorMessage="The fields must match." ControlToValidate=
    "Text1" Type="String" ValueToCompare="Sunday" Operator=
    "Equal" Display="Dynamic">*
(3) </asp: CompareValidator>
```

The associated input control object (i.e., a textbox object) is declared in line (1). The CompareValidator is declared in lines (2)–(3). The "id" property defines an identifier of the validator itself The "runat" property specifies that the validator is implemented as a server-side control object (which nevertheless can generate both server-side and client-side validation logic). The "ErrorMessage" property defines the text to be shown (either in the validator's location or in the validation summary) if the validation fails. The "ControlToValidate" property associates the CompareValidator1 validator with the Text1 textbox declared in line (1). The "Type" property defines the anticipated data type of the input data. The "ValueToCompare" property defines a hard coded String value against which to compare the input data. The "Operator" property specifies the comparison operation to be "equals". The "Display" property defines the display mode of the validator as "dynamic". The "*" represents the contents of the validator, which is displayed at the location of the validator in the Web page to indicate an error condition if the validation fails.

FIG. 12 illustrates the structure of a RangeValidator in an embodiment of the present invention. A RangeValidator 1200 provides validation using a specified range of valid values (i.e., a validation criterion). The RangeValidator 1200 inherits from the BaseValidator class and provides an IValidator interface. The range of values may be defined by hard coded values (e.g., the MinimumValue property) or the input data stored as a property (i.e., the Validation property) of a specified input control object (e.g., the MinimumControl property). On line 6, the readable/settable property, Type, defines the ValidationDataType of the input data, similar to the Type property of the CompareValidator. (see the discussion of FIG. 11 for a description of ValidationDataType). Validation fails if the input data, whether from the current input control or the specified input control fails conversion. In addition, if the input data of the current input control fails to fall within the specified range, validation fails.

On line 7, a readable/settable String property, MinimumControl, defines the ID of an input control object having a ValidationProperty that specifies the minimum limit of the specified range. In contrast, on line 9, a readable/settable String property, MaximumControl, defines the ID of an input control that specifies the maximum limit of the specified range. On line 8, a readable/settable String property, MinimumValue, defines a hard coded minimum limit of the specified range. In contrast, on line 10, a readable/settable String property, MaximumValue, defines a hard coded maximum limit to the specified range. If both MaximumControl and MaximumValue are populated, MaximumControl is used to specify the maximum limited of the specified range. Likewise, if both MinimumControl and MinimumValue are populated, MinimumControl is used to specify the minimum limited of the specified range.

In an alternative embodiment, the MaximumControl/MinimumControl functionality of the RangeValidator is omitted. Instead, equivalent functionality may be provided by declaring one or more CompareValidators to define a control-value-dependent range. As such, in the alternative embodiment, the RangeValidator need only support fixed values.

An excerpt of an exemplary declaration for a web page having a RangeValidator associated with a textbox is shown below:

```
(1) <input id=Text1 type=text runat="server">
(2) <asp:RangeValidator id="rangeVal" runat=server
    ControlToValidate="TextBox1" MinimumValue="1"
    MaximumValue="10"> Enter a number between 1 and 10
(3) </asp:RangeValidator>
```

The associated input control object (i.e., a textbox object) is declared in line (1). The RangeValidator is declared in lines (2)–(3). The "id" property defines an identifier of the validator itself ("rangeVal"). The "runat" property specifies that the validator be implemented as a server-side control (which nevertheless can generate both server-side and client-side validation logic). The "ControlToValidate" property associates the "rangeVal" validator with the Text1 textbox declared in line (1). The "MinimumValue" property specifies a lower range limit and the "MaximumValue" property specifies a higher range limit. The text "Enter a number between 1 and 10" represents the contents of the validator, which is displayed at the location of the validator in the Web page to indicate an error condition if the validation fails.

FIG. 13 illustrates the structure of a CustomValidator in an embodiment of the present invention. The CustomValidator 1300 allows a Web page author to declare custom client-side and server-side validation logic. The Web page author may therefore develop a customized validation criterion against which the input data is evaluated. The CustomValidator 1300 inherits from the BaseValidator class and provides an IValidator interface. Client-side validation may be defined on line 6 in the form of a script expression that is to be rendered into the HTTP response to the client. The script expression will then be executed on the client to validate the input data of the associated input control. In one embodiment, the script expression is defined in the form "function myvalidator(source, value)", where "source" defines is the client-side representation of the validator that raised the validation event and "value" defines the value of the input control object being validated.

In contrast, server-side validation may be defined on line 7 in the form of an Event. The server side validation object is passed into the validator. In addition, the value of the object is stored in the object being validated and a settable Boolean return value (i.e., to indicate validity or invalidity of the control being validated) are properties of the ServerValidateEventArgs parameters to the validator.

An excerpt of an exemplary declaration for a web page having a CustomValidator associated with a textbox is shown below:

```
(1) <asp:TextBox id="txtCustomData" runat="server">
    </asp:TextBox>
(2) <asp:CustomValidator id="customVal" runat=server
    ErrorMessage="Number not divisible by 2!" ControlToValidate=
    "txtCustomData" OnServerValidate=ServerValidation
    ClientValidationFunction="ClientValidation"> *
    </asp:CustomValidator><br>
(3) <script runat=server language=c#>
(4) public void ServerValidation(object source,
    ServerValidateEventAgs args) {
(5)     try {
```

-continued

```
(6)         int i = int.Parse(args.Value);
(7)         args.IsValid = ((i % 2) = = 0);
(8)     } catch {
(9)         args.IsValid = false;
(10)    }
(11) }
(12) </script>
(13) <script language=vbscript>
(14) function ClientValidation(source, value)
(15)     On Error Resume Next
(16)     ClientValidation = ((value mod 2) = 0)
(17)     if err.Number < > 0 then
(18)         ClientValidation = false
(19)     end if
(20) end function
(21) </script<
```

The associated input control object (i.e., a textbox object) is declared in line (1). The CustomValidator is declared in lines (2)–(21). The "id" property on line (2) defines an identifier of the validator itself. The "runat" property specifies that the validator be implemented as a server-side control object (which nevertheless can generate both server-side and client-side validation logic). The "ErrorMessage" property defines the text to be shown (either in the validator's location or in the validation summary) if the validation fails. The "ControlToValidate" property associates the CustomVal validator with the txtCustomData textbox declared in line (1). The "OnServerValidate" property specifies the name of the server validation script (defined on lines (3) to (12)). The "ClientValidationFunction" property specifies the name of the client validation script (defined on lines (13) to (21)). The "*" represents the contents of the validator, which is displayed at the location of the validator in the Web page to indicate an error condition if the validation fails.

FIG. 14 illustrates the structure of a ValidationSummary in an embodiment of the present invention. The ValidationSummary class 1400 defines an object that displays all validation errors of a page in a summary view format The ValidationSumnary class inherits from the WebControl class. The error messages can be displayed in a list, a bulleted list, or a paragraph format. The errors can be displayed inline (within the page) and/or in a popup message box. On line 6, a readable/settable String property, HeaderText, defines the text to be displayed at the top of the ValidationSummary. This text may contain HTML tags, if desired.

On line 7, a readable/settable property, DisplayMode, defines the ValidationSummaryDisplayMode for the ValidationSummary. As defined in lines 11–16, the ValidationSummaryDisplayMode supports a List mode, a BulletList mode, and a SingleParagraph mode, although other modes are contemplated within the scope of the present invention. On line 8, a readable/settable Boolean property, ShowSummary, indicates whether the contents of the ValidationSummary are to be shown in the Web Page. On line 9, a readable/settable Boolean property, ShowMessageBox, indicates whether the contents of the ValidationSummary are to be shown in a popup message box.

Figure 15:
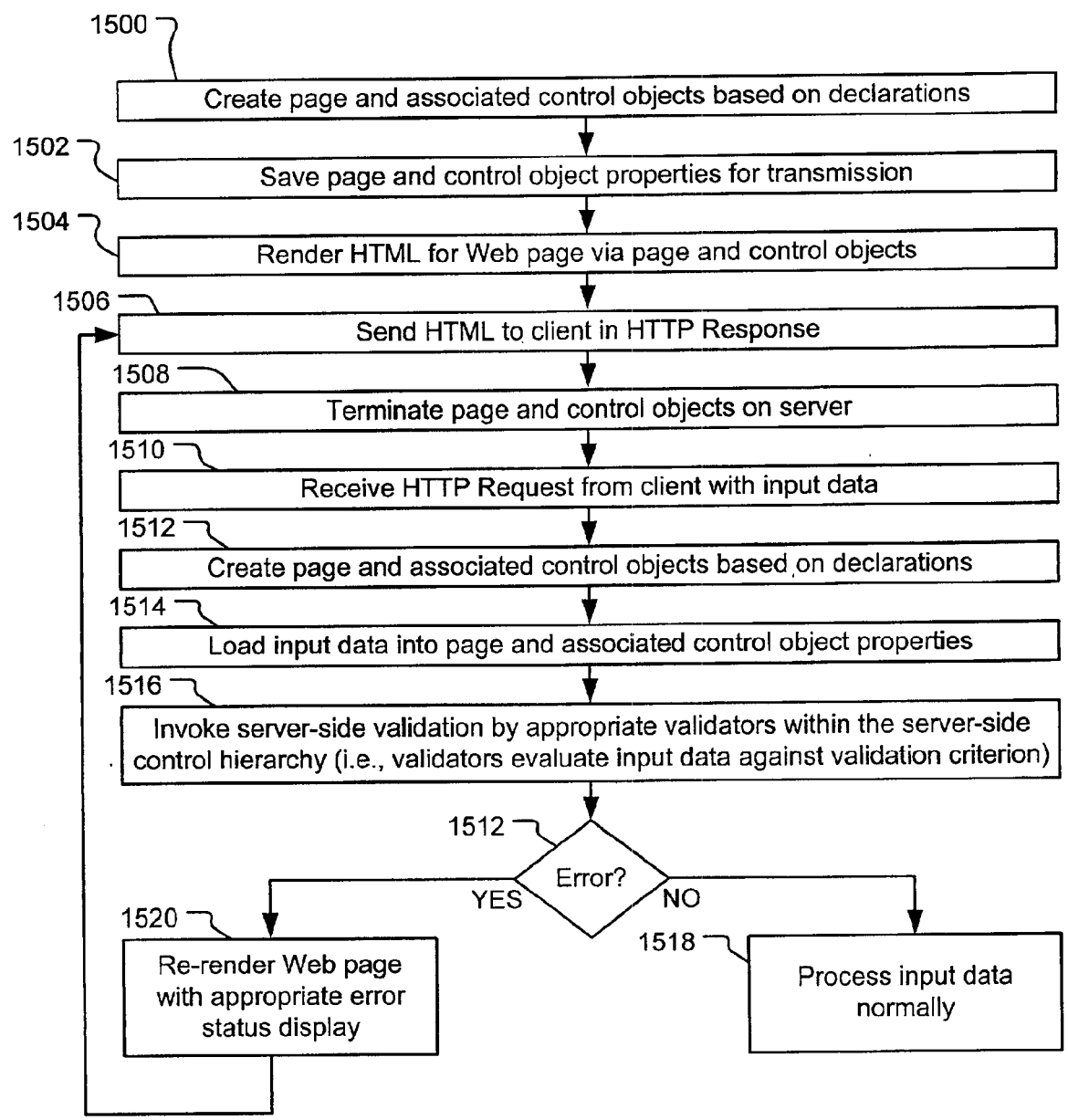
FIG. 15 illustrates operations relating to server-side web control validation in an embodiment of the present invention.

FIG. 15 illustrates operations relating to server-side web control validation in an embodiment of the present invention. Creation operation 1500 creates or generates the server-side page object and the associated server-side control objects associated with a specified dynamic content resource. Declarations within the dynamic content resource specify which control objects are to be created in the server-side control object hierarchy. Saving operation 1502 saves control object properties for transmission in an HTTP response. Rendering operation 1504 renders authoring language (e.g., HTML) data of the Web page for inclusion in the HTTP response. In an embodiment of the present invention, the server-side page and control objects render the authoring language data, putting the input control objects' properties into hidden fields of the HTTP response, prior to termination of the server-side control object hierarchy. Transmission operation 1506 sends the authoring language data to the client in an HTTP response. Termination operation 1508 terminates the page and control objects on the server.

After client processing completes, a receipt operation 1510 receives the HTTP request to the server, wherein the HTTP request includes input data from the client. Creation operation 1512 re-creates or re-generates the page and control objects. Loading operation 1514 loads the input data into the appropriate properties of the appropriate input control object. Invocation operation 1516 invokes validation using the validators in the server-side control object hierarchy. The validators are declared in the dynamic content resource in association with various input controls objects. Because the input data may be received from multiple client-side input control elements, each validator evaluates a portion of the input data against a validation criterion held by the validator. (It should be understood that the portion of the input data may comprise 100% of the input data if the input data is received through a single input control element.) If the validation fails, as determined by conditional operation 1512, rendering operation 1520 re-renders the Web page with the appropriate error message, validation summary or other indication and proceeds to transmission operation 1506. If the validation is successful, processing operation 1518 processes the input data normally. For example, the input data may be passed on to a back-end server process for storage in a database.

Figure 16:
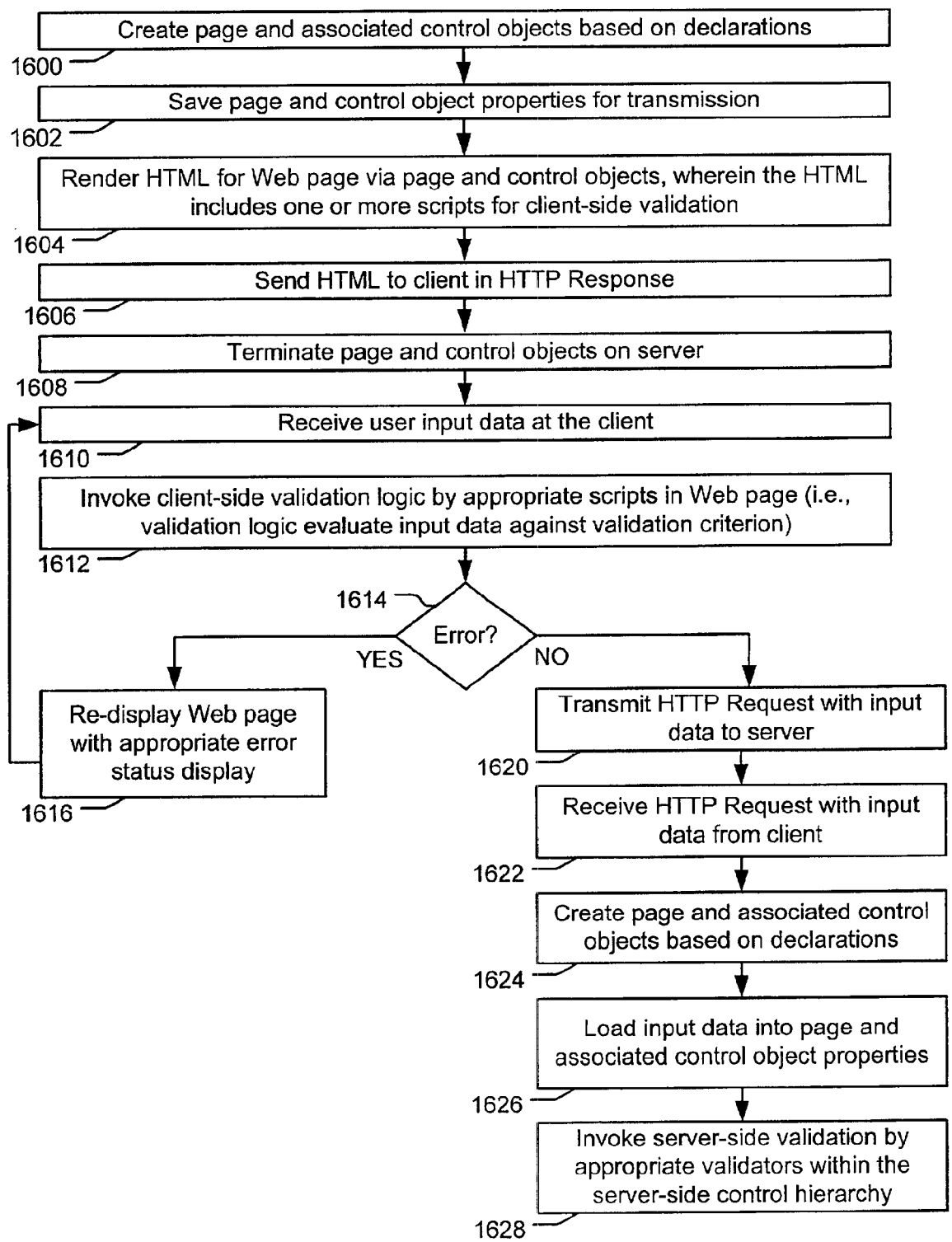
FIG. 16 illustrates operations relating to client-side web control validation in an embodiment of the present invention.

FIG. 16 illustrates operations relating to client-side web control validation in an embodiment of the present invention. Creation operation 1600 creates or generates the server-side page object and the associated server-side control objects associated with a specified dynamic content resource. Declarations within the dynamic content resource specify which control objects are to be created in the server-side control object hierarchy. Saving operation 1602 saves input control object properties for transmission in an HTTP response. Rendering operation 1604 renders authoring language (e.g., HTML) data of the Web page for inclusion in the HTTP response. In contrast to the server-side validation description, however, the rendered HTML includes one or more scripts for validating input data on the client. Transmission operation 1606 sends the authoring language data to the client in an HTTP response. Termination operation 1608 terminates the page and control objects on the server.

The transmitted authoring language data, which contains rendered validation scripts, is received by the client. Receipt operation 1610 receives input data through an input control element (e.g., a textbox) in the web page. Invocation operation 1612 invokes one or more validation scripts associated with the input control element to evaluate the input data against at least one validation criterion. If the validation fails, as determined by conditional operation 1614, display operation 1617 re-displays the Web page with an appropriate error message, validation summary or other indication and proceeds to transmission operation 1506. It should be understood that client-side validation provides for a quick response to an error by avoiding a round-trip to the server and back to the client. Processing then proceeds to receipt operation 1610 to get new input data. For example, the end user may correct the input data or input a "CANCEL" instruction through a button on the Web page.

If the client-side validation is successful, transmission operation 1620 transmits an HTTP request containing the input data to the server. Receipt operation 1622 receives the HTTP request at the server. Based on the declaration in a specified dynamic content file, operation 1624 creates or generates the page and control objects in the server-side control object hierarchy.

Loading operation 1626 loads input data into the properties of appropriate input control objects. Invocation operation 1628 invokes the server-side validation by the appropriate server-side validators, as described with regard to FIG. 15. While not required in an embodiment of the present invention, server-side validation is recommended in combination with client-side validation to capture inadvertent or intentional corruption of input data transmitted between the client and the server.

Figure 17:
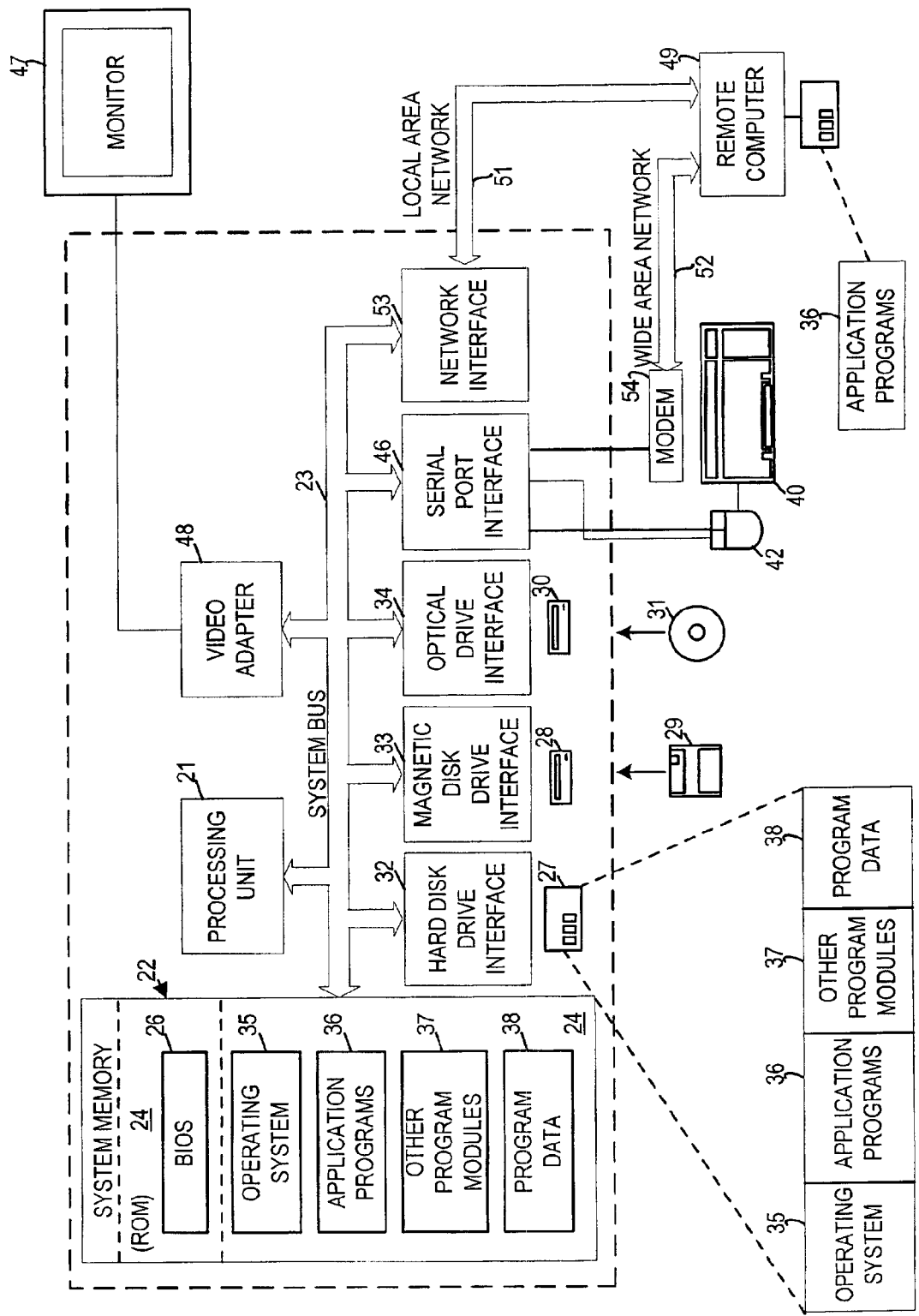
FIG. 17 illustrates an exemplary system useful for implementing an embodiment of the present invention.

The exemplary hardware and operating environment of FIG. 17 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, an HTTP pipeline, one or more validators, one or more handlers may be incorporated as part of the operating system 35, application programs 36, or other program modules 37. Dynamic content resources, static content resources, and application components may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer program product encoding a computer program for executing on a computer system a computer process for validating input data received through at least one client-side input control element in a Web page, each client-side input control element being associated with a server-side input control object declared in a server-side resource, the computer process comprising:

detecting a validator declaration in the server-side resource, the validator declaration being associated with a server-side input control object;

generating a server-side validation object having a validation criterion, responsive to the detecting operation; and evaluating at least a portion of the input data to determine whether the portion of the input data satisfies the validation criterion, the portion of the input data being received through the client-side input control element associated with the server-side input control object;

wherein the validation criterion defines a required field of the server-side input control object, and wherein the portion of the input data is required to populate the required field to be valid.

2. The computer program product of claim 1 wherein the computer process further comprises:

designating a property of the server-side control object as a validation property;

associating the server-side validation object with the server-side input control object; and receiving the portion of the input data into the validation property of the server-side input control object, wherein the evaluating operation comprises evaluating the portion of the input data stored in the validation property against the validation criterion.

3. The computer program product of claim 1 wherein the associating operation comprises:

storing an identifier of the server-side input control object in the server-side validation object.

4. The computer program product of claim 1 wherein the computer process further comprises:

passing the portion of the input data to a server-side process, if the portion of the input data satisfies the validation criterion.

5. The computer program product of claim 1 wherein the computer process further comprises:

withholding the portion of the input data from the server-side process, if the portion of the input data fails to satisfy the validation criterion.

6. The computer program product of claim 1 wherein the input data is received from a client computer system and computer process further comprises:

transmitting to the client computer system an error message indicating a validation failure associated with the portion of the input data, if the portion of the input data fails to satisfy the validation criterion.

7. The computer program product of claim 1 wherein the validation criterion defines a format against which the portion of the input data is evaluated.

8. The computer program product of claim 7 wherein the format is defined by one or more regular expressions.

9. The computer program product of claim 1 wherein the validation criterion defines a requirement that the portion of the input data received through the client-side input control element be different than an initial value.

10. The computer program product of claim 1 wherein the validation criterion defines a validity range against which the portion of the input data is evaluated.

11. The computer program product of claim 1 wherein the validation criterion defines a comparison operation against which the portion of the input data is evaluated.

12. The computer program product of claim 1 wherein the server-side resource is stored on a server computer system and the validation criterion defines a server-side validation function executing on the server computer system to evaluate the portion of the input data.

13. The computer program product of claim 1 further comprising:

generating a validation summary object for displaying on the Web page an error message of one or more validation objects associated with the Web page.

14. A computer program product encoding a computer program for executing on a computer system a computer process for validating input data received through at least one client-side input control element in a Web page, each client-side input control element being associated with a server-side input control object declared in a server-side resource, wherein the server-side resource is stored on a server computer system, and the computer process comprising:

detecting a validator declaration in the server-side resource, the validator declaration being associated with a server-side input control object;

generating a server-side validation object having a validation criterion, responsive to the detecting operation;

evaluating at least a portion of the input data to determine whether the portion of the input data satisfies the validation criterion, the portion of the input data being received through the client-side input control element associated with the server-side input control object; and rendering client-side validation code associated with the client-side input control element, the client-side validation code being adapted to execute on a client computer system and to determine whether the portion of the input data satisfies the validation criterion before the portion of the input data is transmitted from the client computer system to the server computer system.

15. The computer program product of claim 14 wherein the evaluating operation is performed by the client computer system by executing the client-side validation code rendered by the server-side validation object.

16. The computer program product of claim 14 wherein validation criterion defines a client-side validation script adapted to execute on a client computer system and evaluate the portion of the input data.

17. The computer program product of claim 14 wherein the authoring language code is further adapted to withhold transmission of the portion of the input data from the client computer system to the server computer system, if the portion of the input data fails to satisfy the validation criterion.

18. The computer program product of claim 14 wherein the authoring language code is further adapted to generate an error message, if the portion of the input data fails to satisfy the validation criterion.

19. A method of validating input data received through at least one client-side input control element in a Web page, each client-side input control element being associated with a server-side input control object declared in a server-side resource, the method comprising:

detecting a validator declaration in the server-side resource, the validator declaration being associated with a server-side input control object;

generating a server-side validation object having a validation criterion, responsive to the detecting operation;

evaluating at least a portion of the input data to determine whether the portion of the input data satisfies the validation criterion, the portion of the input data being received through the client-side input control element associated with the server-side input control object; and rendering client-side validation code associated with the client-side input control element, the client-side validation code being adapted to execute on a client computer system and to determine whether the portion of the input data satisfies the validation criterion before the portion of the input data is transmitted from the client computer system to the server computer system.

20. The method of claim 19 further comprising:

designating a property of the server-side control object as a validation property;

associating the server-side validation object with the server-side input control object; and receiving the portion of the input data into the validation property of the server-side input control object, wherein the evaluating operation comprises evaluating the portion of the input data stored in the validation property against the validation criterion.

21. The method computer program product of claim 1 wherein the server-side resource is stored on a server computer system and the validation criterion defines a server-side validation function executing on the server computer system to evaluate the portion of the input data.

* * * * *